(12) United States Patent
Ramaswamy et al.

(10) Patent No.: US 8,513,607 B2
(45) Date of Patent: Aug. 20, 2013

(54) ANALOG BASEBAND CIRCUIT FOR A TERAHERTZ PHASED ARRAY SYSTEM

(75) Inventors: Srinath M. Ramaswamy, Murphy, TX (US); Vijay B. Rentala, Plano, TX (US); Brian P. Ginsburg, Allen, TX (US); Baher S. Haroun, Allen, TX (US); Eunyoung Seok, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 314 days.

(21) Appl. No.: 13/085,264

(22) Filed: Apr. 12, 2011

(65) Prior Publication Data

US 2012/0261579 A1   Oct. 18, 2012

(51) Int. Cl.
*G01J 5/02* (2006.01)

(52) U.S. Cl.
USPC ........................................ 250/341.8

(58) Field of Classification Search
USPC ............ 250/340, 341.7, 341.8, 359.1, 390.07
See application file for complete search history.

(56) References Cited

U.S. PATENT DOCUMENTS

| | | | | |
|---|---|---|---|---|
| 7,304,306 | B1 * | 12/2007 | Krug ........................... | 250/341.1 |
| 7,449,695 | B2 * | 11/2008 | Zimdars et al. ............ | 250/341.8 |
| 2008/0103394 | A1 * | 5/2008 | McLaughlin et al. ....... | 600/437 |
| 2012/0062286 | A1 * | 3/2012 | Ginsburg et al. ............ | 327/148 |
| 2012/0153148 | A1 * | 6/2012 | Federici et al. ............. | 250/332 |
| 2012/0313895 | A1 * | 12/2012 | Haroun et al. ............... | 345/175 |

FOREIGN PATENT DOCUMENTS

WO    WO2009028718    3/2009

OTHER PUBLICATIONS

"Filling the THz gap—high power sources and applications," http://dx.doi.org/10.1088/0034-4885/69/2/R01 (Gwyn P Williams), Published 2006.

Low-Power mm-Wave Components up to 104GHz in 90nm ISSCC 2007, Feb. 2007, San Francisco, CA, pp. 200-201 (Babak Heydari, Mounir Bohsali, Ehsan Adabi, Ali M. Niknejad).

"Millimeter-Wave CMOS Digital Controlled Artificial Dielectric Differential Mode Transmission Lines for Reconfigurable ICS," 2008 IEEE MTT-S IMS, 2008, pp. 181-184 (Tim LaRocca, Sai-Wang Tam, Daquan Huang, Qun Gu, Eran Socher, William Hant, and Frank Chang).

"A 52 GHz Phased-Array Receiver Front-End in 90 nm Digital CMOS," IEEE Journal of Solid-State Circuits, vol. 43, No. 12, Dec. 2008, pp. 2651-2659 (Karen Scheir, Stephane Bronckers, Jonathan Borremans, Piet Wambacq and Yves Rolain).

(Continued)

*Primary Examiner* — David Porta
*Assistant Examiner* — Gisselle Gutierrez
(74) *Attorney, Agent, or Firm* — Alan A. R. Cooper; Wade J. Brady, III; Frederick J. Telecky, Jr.

(57) ABSTRACT

A method for determining the position of a target is provided. Several emitted pulses of terahertz radiations are emitted from a phased array (which has several transceivers) in consecutive cycles (typically). These emitted pulses are generally configured to be reflected by a target so as to be received by the phased array within a scan range (which includes a digitization window with several sampling periods). Output signals from each of the transceivers are then combined to generate a combined signal for each cycle. The combined signal in each sampling period within the digitization window for emitted pulses is averaged to generate an averaged signal for each sampling period within the digitization window. These averaged signals are then digitized.

17 Claims, 6 Drawing Sheets

(56) References Cited

OTHER PUBLICATIONS

"A Multi-Path Gated Ring Oscillator TDC With First-Order Noise Shaping," IEEE Journal of Solid-State Circuits, vol. 44, No. 4, Apr. 2009, pp. 1089-1098 (Matthew Z. Straayer and Michael H. Perrott).

"Injection-Locked Oscillators with High-Order-Division Operation for Microwave/Millimeter-wave Signal Generation," Dissertation, Oct. 9, 2007 (Huang).

"A Bidirectional TX/RX Four-Element Phased Array at 60 GHz With RF-IF Conversion Block in 90-nm CMOS Process," IEEE Radio Frequency Integrated Circuits Symposium, 2009, pp. 207-210 (Emanuel Cohen, Member, IEEE, Claudio G. Jakobson, Senior Member, IEEE, Shmuel Ravid, and Dan Ritter).

"A Millimeter-Wave (40-45 GHz) 16-Element Phased-Array Transmitter in 0.18-um SiGe BiCMOS Technology," IEEE Journal of Solid-State Circuits, vol. 44, No. 5, May 2009, pp. 1498-1509 (Kwang-Jin Koh, Jason W. May, and Gabriel M. Rebeiz).

Injection- and Phase-Locking Techniques for Beam Control, IEEE Transactions on Microwave Theory and Techniques, vol. 46, No. 11, Nov. 1998, pp. 1920-1929 (Robert A. York and Tatsuo Itoh).

"An Integrated Subharmonic Coupled-Oscillator Scheme for a 60-GHz Phased-Array Transmitter," IEEE Transactions on Microwave Theory and Techniques, vol. 54, No. 12, Dec. 2006, pp. 4217-4280 (James F. Buckwalter, Aydin Babakhani, Abbas Komijani, and Ali Hajimiri, Member, IEEE).

\* cited by examiner

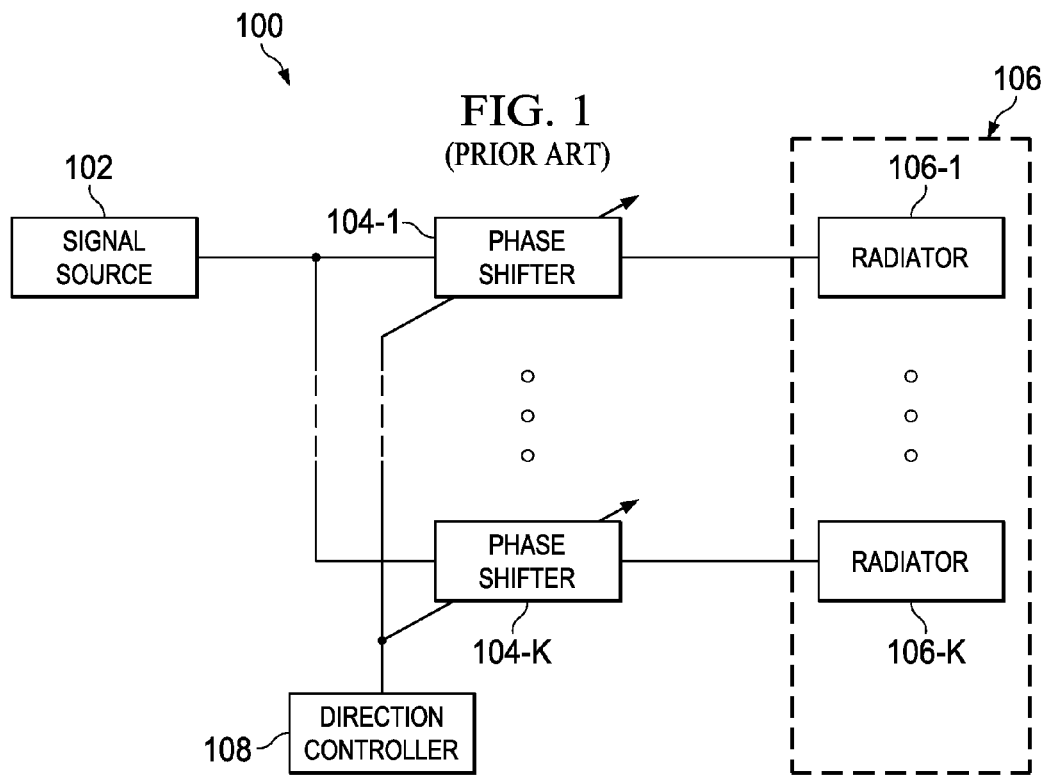
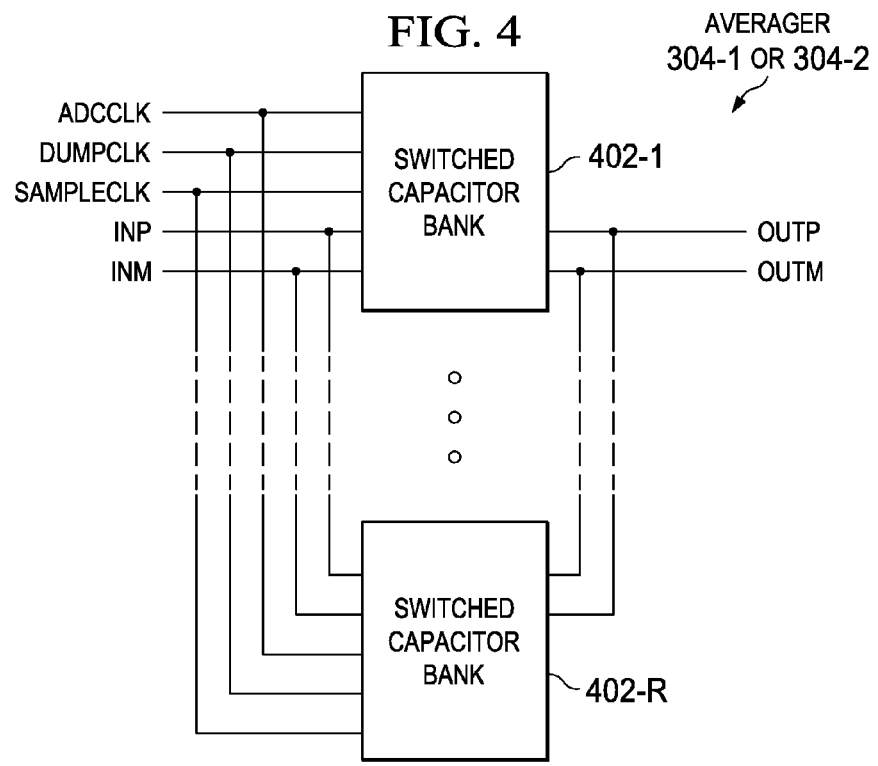

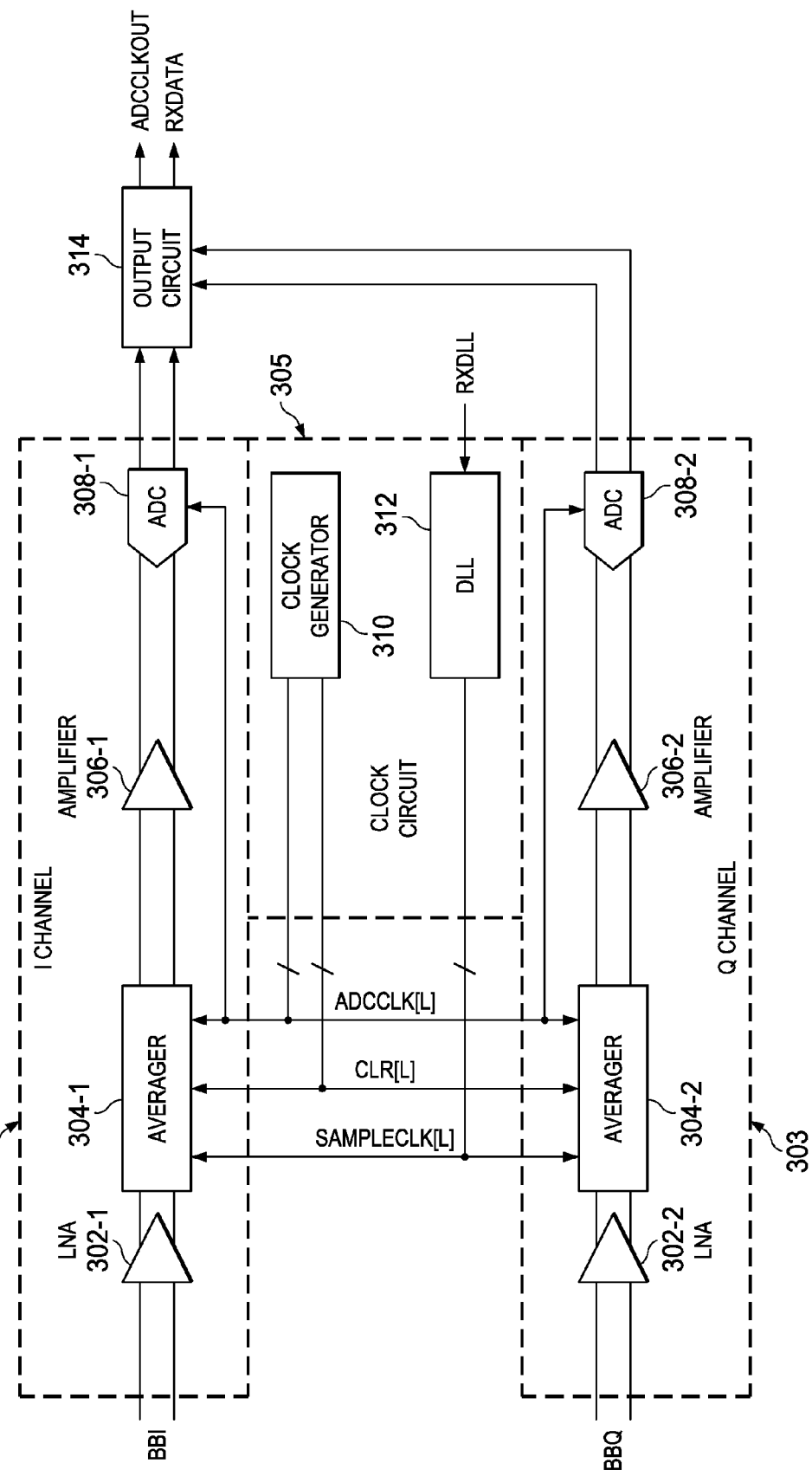

ANALOG BASEBAND CIRCUIT FOR A TERAHERTZ PHASED ARRAY SYSTEM

CROSS-REFERENCE TO RELATED APPLICATIONS

The subject matter of this application is related to co-pending U.S. patent application Ser. No. 12/871,626, entitled "DOWNCONVERSION MIXER," filed on Aug. 30, 2010 and co-pending U.S. patent application Ser. No. 12/878,484, entitled "TERAHERTZ PHASEDARRAY SYSTEM," filed on Sep. 9, 2010. Each application is hereby incorporated by reference for all purposes.

TECHNICAL FIELD

The invention relates generally to a phased array and, more particularly, to an "on-chip" terahertz phased array system.

BACKGROUND

Phase array systems have become commonplace, having several uses. The most common use for phased array systems is radar systems (i.e., pulse radar and Doppler shift radars). As a matter of fact, phased array radar has replaced most of the previous generations of mechanical sweep radar systems because there is a lower likelihood of failure due to wear since mechanic components are replaced with electronics and because the sweep rates are much higher.

Turning to FIG. 1, block diagram illustrating the basic functionality of a conventional phased array system 100. System 100 generally comprises a signal generator 102, phase shifters 104-1 to 104-K, a phased array 106 that includes radiators 106-1 to 106-K, and a direction controller 108. In operation, the signal generator 102 provides a signal that is to be transmitted (i.e., pulse for a pulse radar). Based on the desired direction, the direction controller 108 provides control signals to the phase shifters 104-1 to 104-K, which varies the phase of the signal provided to each of the radiators 106-1 to 106-k within the phased array. Because the signals transmitted through radiators 106-1 through 106-K are generally out-of-phase with one another, constructive and destructive interference of the radiated signal forms a beam in a desired direction.

These conventional systems, though, have been limited to conventional radio frequency (RF) frequency ranges. For example, the frequency range for conventional radar is between 3 MHz (for HF-band radar) and 110 GHz (for W-band radar). A reason for the use of these relatively low frequency ranges is that there has, historically, been an unavailability of compact semiconductor sources of coherent radiation at the terahertz frequency range (which is generally between 0.1 THz and 10 THz). Generally, electronics and oscillators in the microwave range run out of power gain with increasing frequency, and typical broadband infrared blackbody sources begin losing available power within this region. Use of terahertz radiation, however, is highly desirable because of its unique properties. Namely, terahertz radiation has properties of lower frequency radiation (i.e., microwaves) in that it can be generated electrically and higher frequency radiation (i.e., visible light) in that it can be controlled using optics.

Today, there exists two general types of terahertz sources: incoherent source and coherent sources. The incoherent sources are generally broadband incoherent thermal sources, which includes ultra-short femtosecond pulsed laser exciting photo conductive antennas, nonlinear electro-optical crystals, or non-linear transmission lines that suffers from very poor conversion efficiency (1 W laser pulse produces broadband energy in the nW-mW range). The coherent sources are generally narrowband continuous wave (CW) coherent sources which include diode multiplying microwave oscillators, gas lasers using carbon dioxide laser pumping methanol or cyanic acid, optical down conversion by difference mixing, and semiconductor quantum lasing. These coherent sources, though, generally consume a large amount of power, are not compact, require exotic materials, and/or are expensive.

Therefore, there is a need for a compact source of terahertz radiation, namely integrated into an integrated circuit.

Some examples of conventional circuits are: Williams, "Filling the THz Gap," doi:10.1088/0034-4885/69/2/R01; Heydari et al., "Low-Power mm-Wave Components up to 104 GHz in 90 nm CMOS," *ISSCC* 2007, pp. 200-201, February 2007, San Francisco, Calif.; LaRocca et al., "Millimeter-Wave CMOS Digital Controlled Artificial Dielectric Differential Mode Transmission Lines for Reconfigurable ICs," IEEE MTT-S IMS, 2008; Scheir et al., "A 52 GHz Phased-Array Receiver Front-End in 90 nm Digital CMOS" *JSSC* December 2008, pp. 2651-2659; Straayer et al. "A Multi-Path Gated Ring Oscillator TDC With First-Order Noise Shaping," *IEEE J. of Solid State Circuits*, Vol. 44, No. 4, April 2009, pp. 1089-1098; Huang, "Injection-Locked Oscillators with High-Order-Division Operation for Microwave/Millimeter-wave Signal Generation," Dissertation, Oct. 9, 2007; Cohen et al., "A bidirectional TX/RX four element phased-array at 60 HGz with RF-IF conversion block in 90 nm CMOS processes," 2009 *IEEE Radio Freq. Integrated Circuits Symposium*, pp. 207-210; Koh et al., "A Millimeter-Wave (40-65 GHz) 16-Element Phased-Array Transmitter in 0.18-μm SiGe BiCMOS Technology," *IEEE J. of Solid State Circuits*, Vol. 44, No. 5, May 2009, pp. 1498-1509; York et al., "Injection- and Phase-locking Techniques for Beam Control," *IEEE Transactions on Microwave Theory and Techniques*, Vol. 46, No. 11, November 1998, pp. 1920-1929; Buckwalter et al., "An Integrated Subharmonic Coupled-Oscillator Scheme for a 60-GHz Phased Array Transmitter," *IEEE Transactions on Microwave Theory and Techniques*, Vol. 54, No. 12, December 2006, pp. 4271-4280; and PCT Publ. No. WO2009028718.

SUMMARY

A preferred embodiment of the present invention, accordingly, provides a method. The method comprises: generating a plurality of emitted pulses of terahertz radiation from a phased array having a plurality of transceivers, wherein each emitted pulse is configured to be reflected by a target so as to be received by the phased array within a scan range, and wherein the scan range includes a digitization window having a plurality of sampling periods; combining output signals from each of the transceivers to generate a combined signal for each emitted pulse; averaging the combined signal in each sampling period within a digitization window for the plurality of emitted pulses to generate an averaged signal for each sampling period within the digitization window; and digitizing the averaged signal for each sampling period within the digitization window In accordance with another preferred embodiment of the present invention, the digitization window further comprises a plurality of sampling instants, and wherein the step of averaging further comprises: actuating at least one of a plurality of switches at each sampling instant; and charging a capacitor that is associated with the actuated switch.

In accordance with another preferred embodiment of the present invention, the digitization window further comprises a first digitization window from a plurality of digitization windows, and wherein the method further comprises: performing the steps of generating, combining, averaging, and digitizing for the first digitization window; determining whether to continue scanning based on whether the target is present; and repeating the step of performing if the target is not present.

In accordance with another preferred embodiment of the present invention, the digitization window further comprises a first digitization window from a plurality of digitization windows, and wherein the method further comprises performing the steps of generating, combining, averaging, and digitizing for each digitization window of the plurality of digitization windows.

In accordance with another preferred embodiment of the present invention, an apparatus is provided. The apparatus comprises a local oscillator that generates a local oscillator signal and a pulse signal; a plurality of transceivers, wherein each transceiver receives the local oscillator signal and pulse signal from the local oscillator, and wherein each transceiver provides an output signal for each transmission cycle of a plurality of transmission cycles; and receiver circuitry that generates a combined signal from each output signal from the transceivers and that includes an analog baseband circuit, wherein the analog baseband circuit averages the combined signal for a plurality of sampling periods within a digitization window to generate a plurality of averaged signals and converts the plurality of averaged signals to a digital signal.

In accordance with another preferred embodiment of the present invention, the digitization window further comprises a plurality of sampling instants, and wherein the analog baseband circuit further comprises: means for actuating at least one of a plurality of switches at each sampling instant; and means for charging a capacitor that is associated with the actuated switch.

In accordance with another preferred embodiment of the present invention, the digitization window further comprises a first digitization window from a plurality of digitization windows, and wherein the method further comprises: means for performing the steps of generating, combining, averaging, and digitizing for the first digitization window; means for determining whether to continue scanning based on whether the target is present; and means for repeating the step of performing if the target is not present.

In accordance with another preferred embodiment of the present invention, an apparatus comprising: a local oscillator that generates a local oscillator signal and a pulse signal; a distribution network that is coupled to the local oscillator; a plurality of transceivers, wherein each transceiver is coupled to the distribution network so as to receive the local oscillator signal and the pulse signal; receiver circuitry having: a summing circuit that is coupled to each transceiver; an analog baseband circuit that is coupled to the summing circuit, wherein the analog baseband circuit averages the combined signal for a plurality of sampling periods within a digitization window to generate a plurality of averaged signals and converts the plurality of averaged signals to a digital signal.

In accordance with another preferred embodiment of the present invention, the analog baseband circuit further comprises: a clock circuit; a low noise amplifier (LNA) that is coupled to the summing circuit; an averager that is coupled to the LNA and the clock circuit; an analog-to-digital converter (ADC) that is coupled to the LNA and the clock circuit; and an output circuit that is coupled to the ADC.

In accordance with another preferred embodiment of the present invention, the baseband circuit further comprises an amplifier that is coupled between the averager and the LNA.

In accordance with another preferred embodiment of the present invention, the averager further comprises a plurality of switched capacitor banks that are each coupled to the LNA and that each include a plurality of branches: a first switch that is coupled to the LNA and that is controlled by the clock circuit; a capacitor that is couple to the first switch; and an a second switch that is coupled to the first switch and the capacitor and that is controlled by the clock circuit.

In accordance with another preferred embodiment of the present invention, the clock circuit further comprises: a delay locked loop (DLL) having a plurality of taps, wherein each tap is coupled so as to control the first switch from at least one of the branches from at least one of the banks; and a clock generator that is coupled to the ADC and each second switch from each of the branches of each of the banks.

In accordance with another preferred embodiment of the present invention, the analog baseband circuit further comprises an in-phase channel and a quadrature channel.

In accordance with another preferred embodiment of the present invention, each of the in-phase and quadrature channels further comprise: a clock circuit; an LNA that is coupled to the summing circuit; an averager that is coupled to the LNA and the clock circuit; an ADC that is coupled to the LNA and the clock circuit; and an output circuit that is coupled to the ADC.

In accordance with another preferred embodiment of the present invention, each of the in-phase and quadrature channels further comprises an amplifier that is coupled between the averager and the LNA.

In accordance with another preferred embodiment of the present invention, each averager further comprises a plurality of switched capacitor banks that are each coupled to the LNA and that each include a plurality of branches: a first switch that is coupled to the LNA and that is controlled by the clock circuit; a capacitor that is couple to the first switch; and an a second switch that is coupled to the first switch and the capacitor and that is controlled by the clock circuit.

In accordance with another preferred embodiment of the present invention, the clock circuit further comprises: a delay locked loop (DLL) having a plurality of taps, wherein each tap is coupled so as to control the first switch from at least one of the branches from at least one of the banks; and a clock generator that is coupled to the ADC and each second switch from each of the branches of each of the banks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of an example of a conventional phased array system;

FIG. 3 is a diagram of an example of the analog baseband circuit of FIG. 2;

FIG. 4 is a diagram of an example of the averagers of FIG. 3,

DETAILED DESCRIPTION

Figure 2:
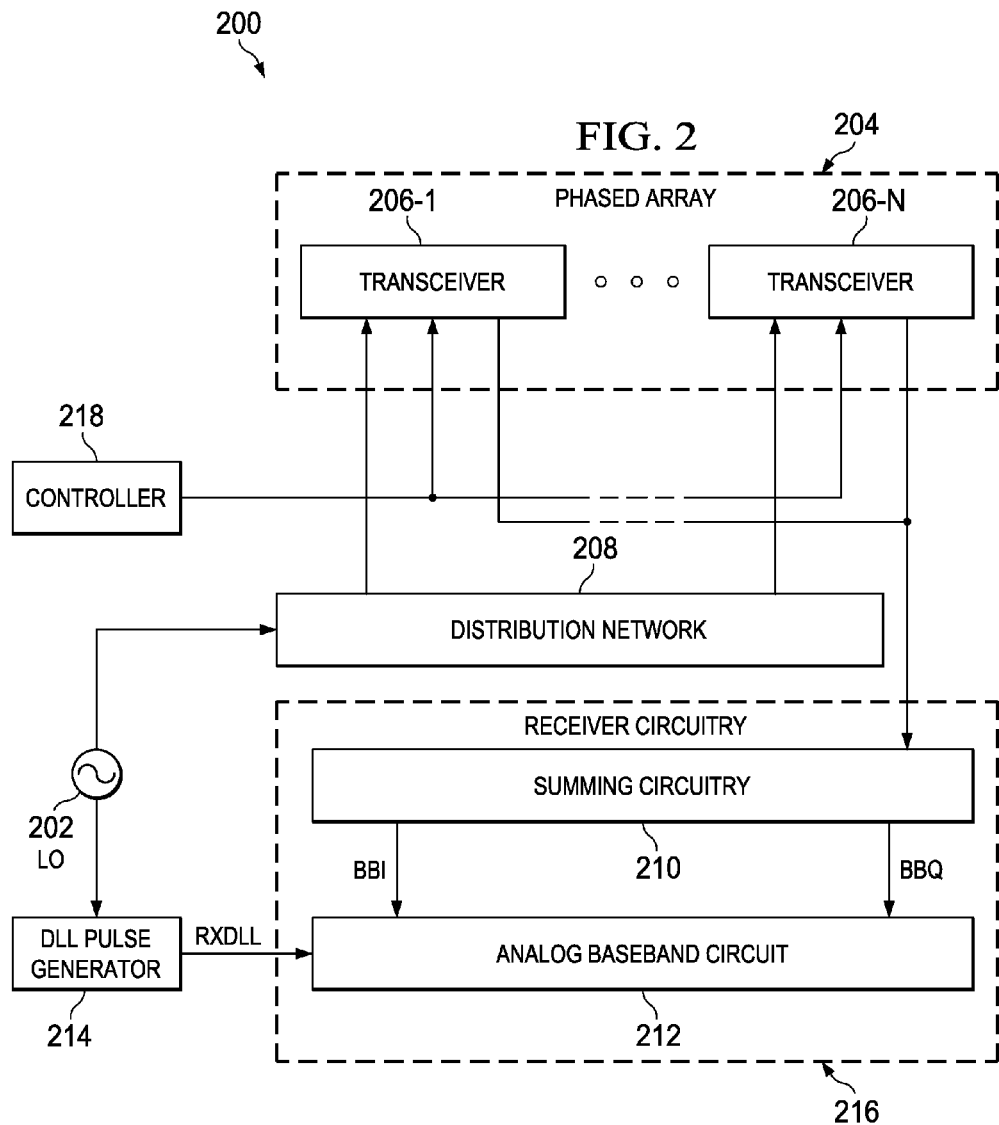
FIG. 2 is a diagram of an example of a phased array system in accordance with a preferred embodiment of the present invention.

Refer now to the drawings wherein depicted elements are, for the sake of clarity, not necessarily shown to scale and wherein like or similar elements are designated by the same reference numeral through the several views.

Turning to FIG. 2, a phased array system 200 in accordance with a preferred embodiment of the present invention can be seen. The phase array system 200 generally comprises a local oscillator (LO) 202, a phased array 204, a distribution network 208, delay-locked loop (DLL) pulse generator 214, receiver circuitry 216, and controller 218. The phased array 204 generally comprises several transceivers 206-1 to 206-N arranged in an array that each include a radiator (i.e., patch antennas, bondwire Yagi-Uda antennas, on-package dipole, or loop antenna). The distribution network 208 generally comprises buffers or amplifiers. Additionally, the receiver circuitry 216 generally comprises summing circuitry 210 and an analog baseband circuit 216. Each of the transceivers 206-1 to 206-N, the local oscillator 202, distribution network 208, and summing circuit 210 are described in detail in co-pending U.S. patent application Ser. No. 12/878,484, entitled "TERAHERTZ PHASEDARRAY SYSTEM," filed on Sep. 9, 2010.

In operation, phased array system 200 (which is generally incorporated into an integrated circuit or IC) can form a short range radar system that operates in the terahertz frequency range (which is generally between 0.1 THz and 10 THz). To accomplish this, local oscillator 202 generates a local oscillator signal that is on the order of tens to hundreds of gigahertz (i.e., 40 GHz, 50 GHz, 67 GHz, and 100 GHz.) and a receive clock signal RXCLK. The distribution network 208 then provides the local oscillator signal to each of the transceivers 206-1 to 206-N such that the signals received by each of transceivers 206-1 to 206-N are substantially in-phase. Controller 218 provides a control signal to array 204, which phase-adjusts the transceivers 206-1 to 206-N with respect to one another to direct a beam of terahertz frequency radiation. The transceivers 206-1 to 206-N can then receive reflected radiation back from a target, which is provided to summing circuitry 210. The output of summing circuitry 210 is then converted to a digital signal by analog baseband circuit 216, which receives its timing from the DLL pulse generator 214.

Generally, this phased array system 200 has several different types of operational modes: pulsed, continuous, and stepped frequency. For a pulsed operational mode, a pulse of terahertz radiation is directed toward a target. The continuous operational mode uses a continuously generated beam. Finally, stepped frequency allows to frequency of the terahertz beam to be changed, which can be accomplished by employing a bank of local oscillators (i.e., 202). For the pulsed operational mode, in particular, the range of the system 200 is governed by the following equation:

$$R = \sqrt[4]{\sigma \frac{PG^2 \lambda n E(n)}{(4\pi)^3 kTBF\left(\frac{S}{N}\right)}}, \quad (1)$$

where:
- R is distance that can be measured or range;
- σ is the radar cross section of the target (usually not equal to the physical cross section);
- S/N is single pulse SNR at the intermediate frequency IF filter output (envelope detector input);
- kTB is the effective incoming noise power in receiver bandwidth B (B≈1/pulsewidth);
- F is noise figure of the receiver (derived parameter);
- P is the peak transmitter power;
- G is the antenna power gain;
- λ is wavelength of the radiation (i.e., for 200 GHz, ≈1.5 mm);
- n is number of integrations of pulses in the receiver (multi-pulse averaging); and
- E(n) is the efficiency of integration.

For a monolithically integrated, low power IC that includes system 200, this range is generally less than one meter. Thus, it should be apparent that in the terahertz frequency range, there is a shortage of available power, which results in decreased sensitivity, and with other frequency range systems being available that have fewer limitations than terahertz systems, transmission and reception in the terahertz range usually becomes attractive when there is a large increase in available bandwidth. However, transmitting, receiving, and digitizing such large bandwidths (i.e., >10 GHz) can be problematic due at least in part on analog-to-digital converter (ADC) performance requirements.

These issues, though, are addressed in system 200. In particular, system 200 generally employs an increased pulse repetition frequency (PRF) of the terahertz radar so as to reduce coherency losses due to target motion. By making use of a high PRF, a small portion (subset) of the total available time for reception can be digitized, and by scanning this subset rapidly, it is possible to generate the full reception interval, reducing the overhead for a very high sampling frequency on the ADC. The high PRF can also generally ensure that it is possible to digitize the desired reception interval very quickly. Additionally, because of the lack of signal power, most signals should include baseband averaging of pulse reception, in system 200 some averaging is performed in the analog domain so as to reduce the ADC and digitization conversion rate to be equal to the PRF, which is an easily manageable task.

Turning to FIG. 3, the analog baseband circuit 212, which performs the analog averaging and digitization for system 200, can be seen in greater detail. The analog baseband circuit 212 generally comprises an in-phase or I channel 301, a quadrature or Q channel 303, a clock circuit 305, and an output circuit 314. Each of these channels 301 and 303 generally and respectively includes a low noise amplifier (LNA) 302-1 and 302-2, an averager 304-1 and 304-2, an amplifier 306-1 and 306-2, and an ADC 308-1 and 308-2. The clock circuit 305 generally comprises a clock generator 310 (which can generate an ADC clock signal ADCCLK[L] and a clear signal CLR[L]) and a DLL 312 (which can generate a sample clock signal SAMPLECLK[L]).

In operation, a digital output signal RXDATA and clock signal ADCCLKOUT are generated from the baseband input signals BBI and BBQ and DLL clock signal RXDLL. Typically, BBI and BBQ are differential signal (as shown), but may also be single-ended. These I and Q baseband signals BBI and BBQ (which are generally received from the summing circuitry 210) are respectively amplified by amplifiers 302-1 and 302-2. Because there are difficulties in digitizing the high bandwidth (as explained above), the performance requirements for ADCs 308-1 and 308-2 can be reduced by averaging the output of LNAs 302-1 and 302-1 with averagers 304-1 and 304-2.

Figure 5:
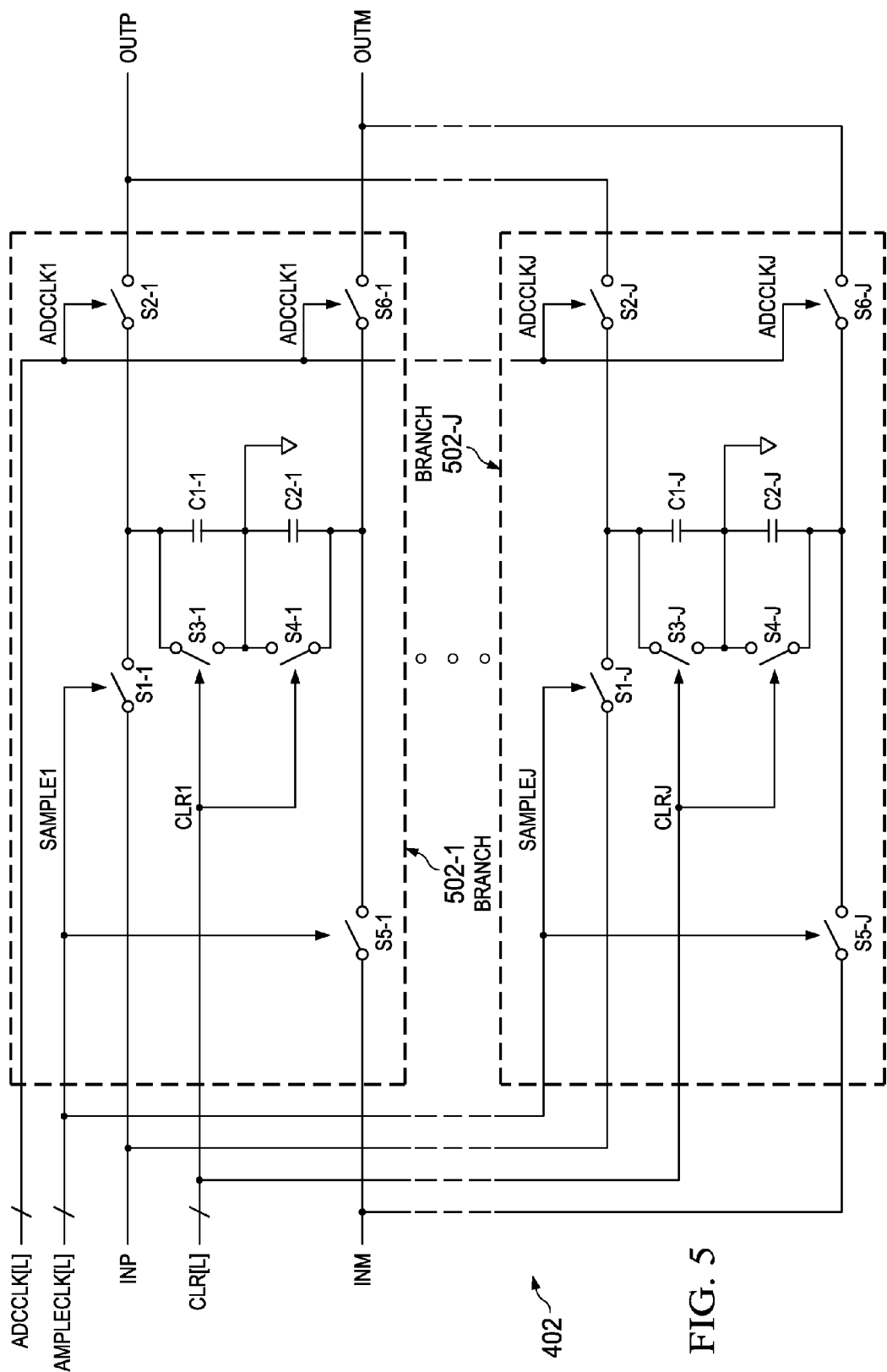
FIG. 5 is a diagram of an example of the switched capacitor banks of FIG. 4.

The averagers 304-1 and 304-2 (which can be seen in greater detail in FIGS. 4 and 5) generally comprise switched capacitor banks 402-1 to 402-R with each bank having several branches 502-1 to 502-J; for example and as shown in FIG. 5, each branch (which is labeled 402) has J branches. As with the baseband signals BBQ and BBI, branches 502-1 to 502-J are arranged to receive differential signals, but branches 502-1 to 502-J can be arranged to receive single-ended signals. These branches 502-1 to 502-J generally and respectively comprise sample switches S1-1 to S1-J and S5-1 to S5-J, capacitors C1-1 to C1-J and C2-1 to C2-J, clear switches S3-1 to S3-J and S4-1 to 54-J, and output switches S2-1 to 52-J and S6-1 to S6-J. The sample switches S1-1 to S1-J and S5-1 to S5-J are each generally coupled to a tap of the DLL 314 so as to receive branch sample signals SAMPLE1 to SAMPLEL, respectively (where sample clock signal SAMPLECLK[L] is generally comprised of clock signals SAMPLE1 to SAMPLL). Moreover, the clear signal CLR[L] (which generally comprises branch clear signals CLR1 to CLRL) can actuate switches S3-1 to S3-J and S4-1 to S4-J to discharge capacitors C1-1 to C1-J and C2-1 to C2-J, while the output switches S2-1 to S2-J and S6-1 to S6-J are actuated by the ADC clock signal ADCCLK[L] (which generally comprises branch readout signals ADCCLK1 to ADCCLKL).

Figure 6:
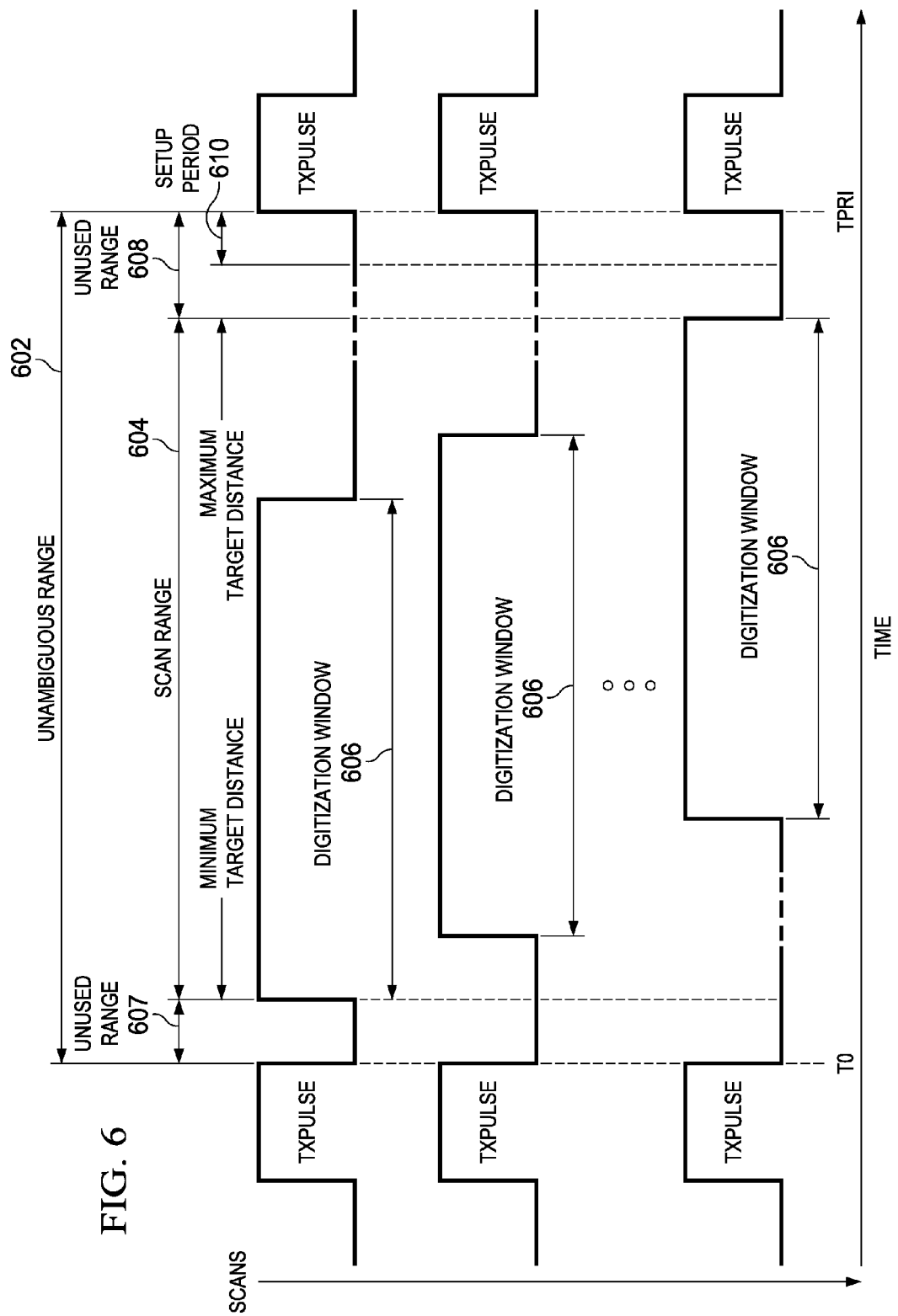
FIGS. 6 and 7 are diagrams demonstrating the operation of the system of FIG. 2.

Turning to FIG. 6, an example of the operation of the analog baseband circuit 216 (and system 200) can be seen. Typically, the controller 230 adjusts the phase shift for each of the transceivers 206-1 to 206-N (for this example) to direct a beam of terahertz radiation emitted from the phased array 204. This emitted radiation is in the form of a pulse that can be directed toward a target so that reflected radiation (from the target) can be received by the transceivers 206-1 to 206-N. These transmitted pulses TXPulse can (for example) each a width of about 100 ps that would correspond to a distance of about 1.5 cm and can be separated from one another by at least an unambiguous range or duration 602 (which allows ample time for reset and detection) between times T0 and TPRI (which is the pulse repetition interval). This unambiguous range 602 can, for example, be 9.9 ns or 1.485 m, which can correspond to a 100 MHz pulsing frequency. Within this unambiguous range 602, there is a scan range 604 between the minimum and maximum target distances and unused ranges 607 and 608. The minimum target distance is generally dictated by far field conditions and may be, for example, about 3 cm, while the maximum target distance is generally limited by the available power reflected by the target and sensitivity of the transceivers 204-1 to 204-N (which may be, for example, about 24 cm). The scan range 604 can be divided into number of range cells (not shown in FIG. 6 for the sake of simplicity) that each have approximately the same width as the transmitted pulse TXPulse (i.e., 100 ps), and a set (i.e., 4) of the range cells can be arranged into a digitization window 606, having a total width of (for example) about 400 ps. The digitization window 606 allows for the reflected and received radiation to be digitized. Additionally, the setup period 610 following the scan range 604 can be used as setup time for analog transmission.

Full coverage over the entire range can be accomplished by moving the digitization window 606 (as shown). However, two scan patterns can be employed to provide this full coverage: lock-step scan and full scan. In lock-step scan, the scanning stops at each range group (digitization window 606), gathers all the data and control loop (i.e., within controller 218) determines whether to move forward based on target presence. In full scan, the digitization window moves across the full scan range 604, and target detection is done after multiple passes of the scan range 604.

Figure 7:
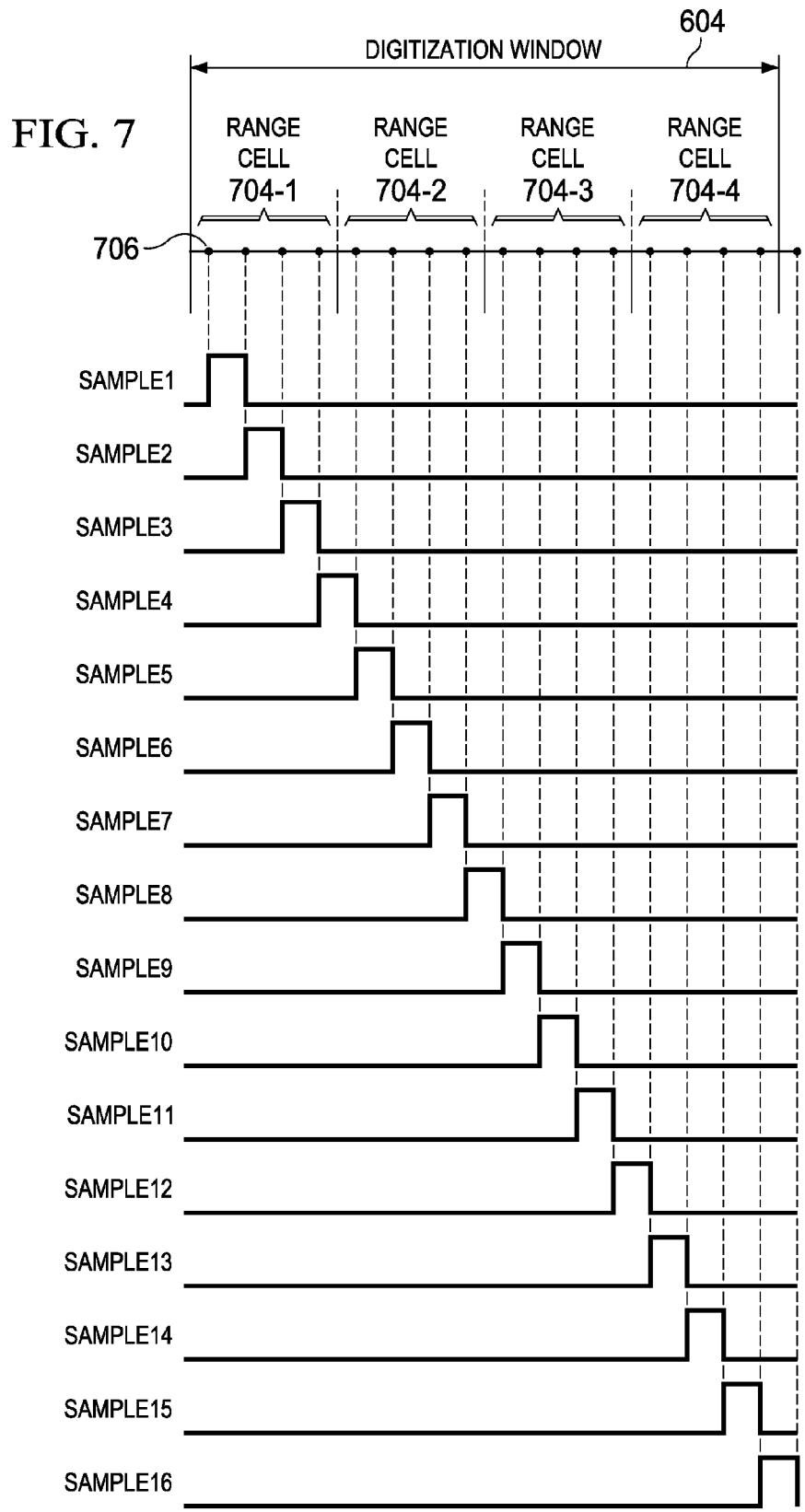

In FIG. 7, the structure and operation of digitization window 606 can be seen in greater detail. As described above, the digitization window 606 is generally comprised of a set of range cells; in this example, there are four range cells 704-1 to 704-4 in window 606. Each of the range cells 704-1 to 704-4 can then be subdivided into sampling instants (i.e., 706). Again, in this example, there are four sampling instants per range cell 704-1 to 704-4 (with a total of 16). Since each sampling instant (i.e., 706) is generally associated with a branch (i.e., 502-1), it can be assumed for this example that there are four transceivers (i.e., 206-1 to 206-4), four switched capacitor banks (i.e., 402-1 to 402-4) with four branches each (i.e., 502-1 to 502-4), sixteen branch sample signals (i.e., SAMPLE1 to SAMPLE16), and sixteen dump branch signals (i.e., SAMPLE1 to SAMPLE16). Additionally, the sampling instants (i.e., 608) can, for example, be separated from one another by 25 ps.

During digitization window 606, averaging of the baseband signals BBI and BBQ is performed. The branch sample signals SAMPLE1 to SAMPLE16 (for the example of FIG. 7) are asserted on each successive sampling instant (i.e., 608) within digitization window 606 so as to actuate sample switches S1-1 to S1-4 and S5-1 to S5-4 for each branch 402-1 to 402-4. These branch sample signals SAMPLE1 to SAMPLE16, in this example, are asserted for substantially the same duration as each of sub-range cell or sampling period (i.e., time between sampling instants which can be about 25 ps). This process is then repeated over a predetermined number (i.e., 16) of transmitted pulses TXPulse (generally in consecutive cycles) such that the each capacitor C1-1 to C1-4 for each branch 402-1 to 402-4 measures the same sub-range cell or same sampling period during each of the repeated cycles. This allows the capacitors C1-1 to C1-4 for each branch 402-1 to 402-4 to "average" its amplified baseband signal (i.e., BBI or BBQ) for its sub-range cell or sampling period over the predetermined number of cycles. Following the completion of the predetermined number of cycles, the ADC clock signal ADCCLK[L] (which is generally synchronized with the sample signal SAMPLECLK[L]) can be asserted so as to actuate output switches S2-1 to S2-4 and S6-1 to S6-4 for each branch 402-1 to 402-4 in order so that ADCs 308-1 and 308-2 can readout and digitize the averaged voltages from each of capacitors C1-1 to C1-4 for each branch 402-1 to 402-4. Once the ADCs 308-1 and 308-2 readout the averaged voltages from each of capacitors C1-1 to C1-4 for each branch 402-1 to 402-4, the branch clear signals CLR1 to CLR16 are asserted so as to actuate clear switches S3-1 to S3-46 and S4-1 to S4-4 for each branch 402-1 to 402-4 to discharge capacitors C1-1 to C1-4 and C2-1 to C2-4 for each branch 402-1 to 402-4.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
generating a plurality of emitted pulses of terahertz radiation from a phased array having a plurality of transceivers, wherein each emitted pulse is configured to be reflected by a target so as to be received by the phased array within a scan range, and wherein the scan range includes a digitization window having a plurality of sampling periods;
combining output signals from each of the transceivers to generate a combined signal for each emitted pulse;
averaging the combined signal in each sampling period within a digitization window for the plurality of emitted pulses to generate an averaged signal for each sampling period within the digitization window; and
digitizing the averaged signal for each sampling period within the digitization window.

2. The method of claim 1, wherein the digitization window further comprises a plurality of sampling instants, and wherein the step of averaging further comprises:
actuating at least one of a plurality of switches at each sampling instant; and
charging a capacitor that is associated with the actuated switch.

3. The method of claim 2, wherein the digitization window further comprises a first digitization window from a plurality of digitization windows, and wherein the method further comprises:
performing the steps of generating, combining, averaging, and digitizing for the first digitization window;
determining whether to continue scanning based on whether the target is present; and
repeating the step of performing if the target is not present.

4. The method of claim 2, wherein the digitization window further comprises a first digitization window from a plurality of digitization windows, and wherein the method further comprises performing the steps of generating, combining, averaging, and digitizing for each digitization window of the plurality of digitization windows.

5. An apparatus comprising:
a local oscillator that generates a local oscillator signal and a pulse signal;
a plurality of transceivers, wherein each transceiver receives the local oscillator signal and pulse signal from the local oscillator, and wherein each transceiver provides an output signal for each transmission cycle of a plurality of transmission cycles; and
receiver circuitry that generates a combined signal from each output signal from the transceivers and that includes an analog baseband circuit, wherein the analog baseband circuit averages the combined signal for a plurality of sampling periods within a digitization window to generate a plurality of averaged signals and converts the plurality of averaged signals to a digital signal.

6. The apparatus of claim 5, wherein the digitization window further comprises a plurality of sampling instants, and wherein the analog baseband circuit further comprises:
means for actuating at least one of a plurality of switches at each sampling instant; and
means for charging a capacitor that is associated with the actuated switch.

7. The apparatus of claim 6, wherein the digitization window further comprises a first digitization window from a plurality of digitization windows, and wherein the method further comprises:
means for performing the steps of generating, combining, averaging, and digitizing for the first digitization window;
means for determining whether to continue scanning based on whether the target is present; and
means for repeating the step of performing if the target is not present.

8. An apparatus comprising:
a local oscillator that generates a local oscillator signal and a pulse signal;
a distribution network that is coupled to the local oscillator;
a plurality of transceivers, wherein each transceiver is coupled to the distribution network so as to receive the local oscillator signal and the pulse signal;
receiver circuitry having:
a summing circuit that is coupled to each transceiver;
an analog baseband circuit that is coupled to the summing circuit, wherein the analog baseband circuit averages the combined signal for a plurality of sampling periods within a digitization window to generate a plurality of averaged signals and converts the plurality of averaged signals to a digital signal.

9. The apparatus of claim 8, wherein the analog baseband circuit further comprises:
a clock circuit;
a low noise amplifier (LNA) that is coupled to the summing circuit;
an averager that is coupled to the LNA and the clock circuit;
an analog-to-digital converter (ADC) that is coupled to the LNA and the clock circuit; and
an output circuit that is coupled to the ADC.

10. The apparatus of claim 9, wherein the baseband circuit further comprises an amplifier that is coupled between the averager and the LNA.

11. The apparatus of claim 9, wherein the averager further comprises a plurality of switched capacitor banks that are each coupled to the LNA and that each include a plurality of branches:
a first switch that is coupled to the LNA and that is controlled by the clock circuit;
a capacitor that is couple to the first switch; and
a second switch that is coupled to the first switch and the capacitor and that is controlled by the clock circuit.

12. The apparatus of claim 11, wherein the clock circuit further comprises:
a delay locked loop (DLL) having a plurality of taps, wherein each tap is coupled so as to control the first switch from at least one of the branches from at least one of the banks; and
a clock generator that is coupled to the ADC and each second switch from each of the branches of each of the banks.

13. The apparatus of claim 8, wherein the analog baseband circuit further comprises an in-phase channel and a quadrature channel.

14. The apparatus of claim 13, wherein each of the in-phase and quadrature channels further comprise:
a clock circuit;
an LNA that is coupled to the summing circuit;
an averager that is coupled to the LNA and the clock circuit;

an ADC that is coupled to the LNA and the clock circuit; and an output circuit that is coupled to the ADC.

15. The apparatus of claim 14, wherein each of the in-phase and quadrature channels further comprises an amplifier that is coupled between the averager and the LNA.

16. The apparatus of claim 14, wherein each averager further comprises a plurality of switched capacitor banks that are each coupled to the LNA and that each include a plurality of branches:

a first switch that is coupled to the LNA and that is controlled by the clock circuit;

a capacitor that is couple to the first switch; and a second switch that is coupled to the first switch and the capacitor and that is controlled by the clock circuit.

17. The apparatus of claim 16, wherein the clock circuit further comprises:

a delay locked loop (DLL) having a plurality of taps, wherein each tap is coupled so as to control the first switch from at least one of the branches from at least one of the banks; and a clock generator that is coupled to the ADC and each second switch from each of the branches of each of the banks.

* * * * *